United States Patent [19]

Junod

[11] 3,932,292
[45] Jan. 13, 1976

[54] PROCESS FOR THE MANUFACTURE OF DOPED SILVER HALIDES
[75] Inventor: Pierre Junod, Fribourg, Switzerland
[73] Assignee: Ciba-Geigy AG, Basel, Switzerland
[22] Filed: Aug. 1, 1973
[21] Appl. No.: 384,667

[30] Foreign Application Priority Data
Aug. 17, 1972 Switzerland................ 12194/72

[52] U.S. Cl............ 252/62.3 R; 423/491; 96/94 R
[51] Int. Cl.²...................... C04B 35/00; H01L 3/00
[58] Field of Search................ 423/491, 492, 494; 96/94 R; 23/301 SP; 252/62.3 R, 501, 514, 518

[56] References Cited
UNITED STATES PATENTS

| | | | |
|---|---|---|---|
| 3,312,571 | 4/1967 | Ruchrwin............ | 252/62.3 R |
| 3,368,895 | 2/1968 | Matejec et al........ | 96/94 R |
| 3,483,028 | 12/1969 | Bell et al............. | 252/501 |
| 3,690,891 | 9/1972 | Spence et al......... | 96/94 R |
| 3,725,310 | 4/1973 | Donohue.............. | 252/501 |
| 3,816,601 | 6/1974 | Junod................. | 423/491 |

FOREIGN PATENTS OR APPLICATIONS
2,115,391   6/1971   Germany

Primary Examiner—Herbert T. Carter
Assistant Examiner—Eugene T. Wheelock
Attorney, Agent, or Firm—Joseph G. Kolodny; Edward McC. Roberts; Prabodh I. Almaula

[57] ABSTRACT

The process of this invention for the production of doped metal halides, especially silver halides, comprises reacting a doped metal with the vapour of the halogen in a closed vessel. A mono- or polycrystalline metal halide body is built up on a stationary or rotating base. Homogenously doped metal halides are obtained.

8 Claims, No Drawings

PROCESS FOR THE MANUFACTURE OF DOPED SILVER HALIDES

German Offenlegungsschrift No. 2,115,391 has disclosed a process for producing, without the use of crucibles, pure metal halides by reaction of pure metals with halogen vapours. It has now been found that, surprisingly, this procedure is also suitable for the manufacture of doped metal halides.

Accordingly, the subject of the invention is a process for the manufacture of doped metal halides, characterised in that doped metal is reacted in a closed reaction vessel, without the use of a crucible, with the vapour of a halogen at a temperature which is below the melting point of the doped metal and above the melting point of the halide, and the liquid or gaseous halide is allowed to grow into a crystalline shaped article on a support at a temperature below the melting point of the halide.

Instead of a single halogen, a mixture of different halogens can also be used in the present process.

By doping, a term customary in semi-conductor technology, there is to be understood the incorporation of foreign substances into pure metal or metal halide. The foreign substances are only present in traces, for example in amounts of 0.1 to 100 parts of foreign substance per $10^6$ parts of metal or metal halide. An accurately determined and absolutely uniform composition of the doped material is of decisive importance.

By a reaction without using a crucible there is to be understood a reaction which is carried out avoiding the use of a crucible or other device where liquid reaction product collects or liquid reaction product remains in contact with the solid starting substance.

The process according to the invention is preferentially suitable for the manufacture of doped silver halides. However, it can also be used for the manufacture of doped halides of the metals of sub-group IV to VI of the periodic system of the elements, or of the rare earths. As examples of these groups there may be mentioned: chromium, molybdenum, niobium, tantalum, titanium, zirconium and lanthanum.

All elements which can be alloyed with the said metals can be used for doping, examples being bismuth, cadmium, gallium, indium, lithium, magnesium, nickel, lead, zinc, manganese, titanium, platinum or tin. Alloys of silver with iron, nickel, sulphur, gold, rhodium and-/or indium are preferred. Whether an element can form an alloy can be seen from the phase diagrams (M. Hansen, Constitution of Binary Alloys, McGraw Hill Co., 1958).

The doped metals can be manufactured by the known process of the zone levelling technique (see W. G. Pfann, Zone Melting, John Willey and Sons Inc. 1966, page 199). In the case of doping with very volatile substances such as, for example, sulphur, the zone melting apparatus must be provided with subsidiary furnaces for preventing the condensation of volatile products, such as are described by J. V. de Boomgard (Journ. Electronics 1 (1955–1956) page 212).

For example, doped silver is obtained by melting a rod of highest purity silver in a very pure graphite boat together with the appropriate amount of the element desired for doping the silver halide and homogenising in 20 passes at a speed of 1 mm/minute. The central, homogeneous part of the doped silver rod is cut out and then converted into doped silver chloride, doped silver bromide or doped silver iodide.

Appropriately, the device described in German Offenlegungsschrift No. 2,115,391 is used. Since a certain amount of doping agent is lost, depending on the temperature, pressure and time, a higher amount of the doping agent must be added to the metal, especially in the case of volatile doping agents, in order to obtain a metal halide containing the desired amount of doping agent.

The device mentioned comprises a tubular reaction chamber to which a source of reduced pressure and a halogen supply vessel can be connected as desired. In the upper part of the reaction chamber there is a holding device for fixing the rod of doped metal without using a crucible, and in the line of fall below this there is a plate, located on a carrier, for receiving the crystal. The holder and the plate can be rotated about axes which are aligned. These axes of rotation are provided with gasket rings and are thus introduced into the reaction chamber in a vapour-tight and vacuum-tight manner. The axes of rotation can be extracted from the reaction chamber together with the holder or the plate, respectively. Two temperature zones which can be controlled separately from one another are formed inside the reaction chamber by means of two heating devices. The first heating device, for example a high frequency coil, heats the doped metal inductively to a temperature which suffices to initiate a reaction with the halogen; the second heating device, for example a radiant furnace, is so controlled that the conditions of solidification of the metal halide permit the formation of monocrystalline or polycrystalline material. The reaction chamber is evacuated before the beginning of the reaction.

The stream of halogen gas required for the reaction is passed into the reaction apparatus from a halogen supply vessel. If the intrinsic vapour pressure of the halogen at room temperature is too great or too low to produce, in the reaction vessel, the halogen concentration suitable for reaction with the metal, the halogen supply vessel is appropriately cooled or warmed by means of a cooling or heating device.

Mixtures of different halogens in a predetermined mixing ratio can be produced by using separate supply vessels for the different halogens, these vessels being kept at different temperatures depending on the desired mixing ratio. Another method consists of the use of carrier gases, with the component streams through the various halogen supply vessels being regulated in accordance with the desired mixing ratio.

In addition to the doped metals, very pure halogens, or mixtures of very pure halogens, are used as starting materials for the manufacture of doped metal halides in the present process.

Thus, for example, chlorine can be adequately purified and dried with concentrated sulphuric acid and phosphorus pentoxide whilst bromine can be distilled over sulphuric acid and iodine can be sublimed. To carry out the process according to the invention with the device described, the following procedure is employed:

A doped metal rod is suspended in the reaction apparatus on the rotatable holder provided for the purpose and thereafter the apparatus is degassed at a pressure of $10^{-5}$ to $10^{-7}$ mm Hg. The diameter of the metal rod can vary within wide limits.

The metal is then heated by means of the first heating device to temperatures which lie in the range of about 400° to 1,100°C, preferably 500° to 1,000°C. Temperatures of 450° to 700°C, preferably 500° to 600°C, have proved advantageous for the reaction of doped silver with the halogens. In fixing the reaction temperature within the ranges mentioned, it is furthermore necessary to ensure that this temperature should always lie above the melting point of the halide produced. The stopcock which connects the halogen supply vessel to the reaction apparatus is opened so that a halogen atmosphere can form in the reaction apparatus. The halogen vapour pressure required for the reaction with the metals is 1 to 500 mm Hg depending on the metal. For the reaction with doped silver, the halogen vapour pressure should be 100 to 500 mm Hg, preferably 100 to 300 mm Hg. In the manufacture of silver bromide, a bromine vapour pressure suitable for the reaction is obtained even at room temperature. This is because the intrinsic vapour pressure of bromine at this temperature is 200 mm Hg. The vapour pressure of chlorine at this temperature is substantially higher so that it is necessary to cool the halogen supply vessel appropriately (solid carbon dioxide/methanol or solid carbon dioxide/acetone cooling baths) in order to keep the formation of halide within controllable limits. In the manufacture of silver iodide, the intrinsic vapour pressure of iodine is brought to a value suitable for the reaction by slight warming.

The liquid metal halide produced in the reaction drips from the metal rod onto a preferably rotating ceramic plate or, preferably, quartz plate, rotating at a speed of about ⅓ to 1 revolution per second. The first drops solidify on the support and form a metal halide base. When the next drops impinge on this, a thin layer is re-melted on the surface of the solid metal halide due to the thermal energy and the heat of solidification of the liquid halide. These solidification conditions, which in the first place are not greatly controlled, can be improved substantially with the aid of the second heating device which is preferably a radiant furnace. The temperature of this furnace is below the melting point of the halide, preferably 30° to 70°C below this temperature, and is set so that the surface tension of the fused halide suffices mechanically to stabilise the molten crest. These oriented and controlled solidification conditions are very favourable for the crucible-free and strain-free formation of the desired doped metal halide crystals. The speed of growth of the metal halide shaped articles varies greatly; for example, for silver halide shaped articles it is a few mm/hour for single crystal formation, but it can also be a few cm/hour when manufacturing polycrystalline materials.

The doped metal halides manufactured according to the invention, especially the silver halides, are used, for example, in semi-conductor technology or for photographic purposes, for example for the manufacture of thin, binder-free light-sensitive photographic layers by vapour deposition.

As is generally known, layers of highest purity silver halide only possess a very low sensitivity to light. This can be influenced by doping. Increasing the light sensitivity (sensitisation) by doping is particularly desirable. However, a lowering of the light sensitivity (desensitisation) which is desirable in some cases can also be achieved by certain doping agents.

The manufacture of doped metal halides has already been attempted previously, say by heating mixtures of metal halides and foreign substances (Swiss Patent Specifications Nos. 216,176, 221,835 and 223,885) or by conjoint vapour deposition of metal halides and foreign substances (German Patent Specification No. 1,180,240 and U.S. Pat. No. 3,219,452). However, it does not prove possible satisfactorily to dope the metal halides in this way. In particular it is only possible with difficulty to distribute the doping agent homogeneously in the base material and the introduction of undesired impurities by the crucible material is virtually unavoidable. If the pure metal halide manufactured according to German Offenlegungsschrift No. 2,115,391 is doped subsequently, it is again only possible to achieve controlled doping of this metal halide, and manufacture the product in reproducible qualities, if extremely strict conditions are observed.

The process according to the invention makes it possible to avoid the disadvantages mentioned in that a metal halide doped in a controlled manner can be manufactured in reproducible qualities.

The quality of the doped metal halides manufactured according to the process can be checked by measurements of the electrical conductivity, by mass spectrometry and especially by photographic sensitometric methods.

EXAMPLE 1

A highest purity silver rod weighing 500 g (diameter: 11 mm, length: 500 mm) is introduced simultaneously with a 100 mg grain of nickel into a boat of highest purity graphite and is subjected to the zone melting process (zone levelling) with the aid of a high frequency generator. When the high frequency zone has travelled 10 times in each direction, at a speed of 1 mm/minute, along the silver rod, the nickel has dissolved in the silver. After the ends of the rod (approx. 10% of the total length at each end), which normally contain a higher Ni concentration, have been removed, a silver rod of about 400 g is obtained, which is homogeneously doped with nickel at a concentration of 180 ppm.

This rod is converted into silver bromide in accordance with the method described in German Offenlegungsschrift No. 2,115,391. The spectral analysis of the material obtained proves that the nickel doping has been homogeneously incorporated at a concentration of 100 ppm into the silver halide.

This doping has a characteristic influence on the physical properties of the silver bromide. The optical absorption of the material is greatly shifted towards the red; at 300°K and 434 nm the absorption coefficient is 3 times greater than that of the pure material. The electrical conductivity also changes because of doping. At 300°K the conductivity of the doped material is about 200 times greater than that of the pure samples. However, the most conspicuous change is in the photographic properties of vapour-deposited layers. If layers of $0.5\mu$ thickness (5,000 A) which have been vapour-deposited from a graphite crucible under a vacuum of at least $10^{-7}$ mm Hg onto glass, are exposed to light of 441 nm (intensity of illumination 1 Lux, exposure times 0.33 to 81 inches) and such layers are developed in a 1-methylamino-4-hydroxybenzene/hydroquinone developer, it is found that the number of developed image centres per $cm^2$ is 10 to 100 times less than in pure material treated in the same way.

EXAMPLE 2

A silver rod which is doped homogeneously with 2 ppm of rhodium is manufactured in the same manner as in Example 1. After this rod has been converted into AgBr in the indicated manner, spectral analyses demonstrate that the rhodium doping has been incorporated homogeneously and that, converted to the weight of silver bromide, the concentration is 1 ppm. This small concentration greatly changes the physical properties of the material. Compared to the pure material, the silver bromide doped with 1 ppm of rhodium has twice as great an electrical conductivity at 300°K. The photographic properties of layers vapour-deposited as in Example 1 are also modified characteristically. The number of latent image centres per cm² which can be developed is greater by a factor of 2 than in the non-doped material.

EXAMPLE 3

A silver rod is doped as in Example 1 with 4 ppm of iron, which approximately corresponds to the maximum solubility of iron in solid silver (G. Tammann and W. Oelson, Z. anorg. Allg. Chem. 186, 257–277 (1930)). Iron-doped silver bromide containing about 2 ppm of iron can be produced from this rod. The concentration can be demonstrated by spectral analysis.

The electrical conductivity of the doped material at 300°K is 5 times greater than that of the pure silver bromide. After exposure and development as in Example 1, the number of developed image centres is 5 times greater than in the pure material.

EXAMPLE 4

The direct doping of a rod of silver by sulphur, through using the zone melting process, was made possible by a combination of the methods of W. G. Pfann and J. V. de Boomgard (loc. sit.).

A silver rod is doped with a homogeneous sulphur concentration of 50 ppm with the side furnaces at a temperature of 250°C, and otherwise under the same conditions as in Example 1. AgBr doped with 10 ppm of sulphur can be obtained from the product.

If the silver rod is not doped directly with elementary sulphur but with the corresponding amount of $Ag_2S$ (melting point 838°C, M Hansen, l.c.), doping with sulphur is possible without controlling the vapour pressure, that is to say without using side furnaces. An identical product is obtained.

The effect of doping with sulphur on the physico-chemical properties of the silver bromide is conspicuously great. The sulphur doping (10 ppm) increases the optical absorption coefficient of the silver bromide at 300°K by a factor of 2 at wavelength 441 nm. The electrical conductivity at 300°K is 20 times greater for the doped material than for the pure material. After exposure and development of vapour-coated plates according to the method of Example 1, an increase in the number of image centres by a factor of 3 to 5 is to be found in the sulphur-doped material, compared with the number of image centres in the pure material.

EXAMPLE 5

This example relates to the manufacture of doped silver halide mixed crystals.

A silver rod doped with 100 ppm of nickel is reacted, according to the process described in DT-OS 2,115,391, with a mixture of halogen vapours containing 90 mol % of bromine and 10 mol % of iodine. The temperature of the bromine container is 23°C ($Br_2$ vapour pressure about 200 mm Hg). The iodine container, and the feed pipeline from the iodine container to the reaction vessel, are heated to 85°C. This temperature corresponds to an iodine vapour pressure of 20 mm Hg. The reaction yields homogeneous silver iodide/bromide having an NaCl lattice, the lattice constant of which was determined by the Debye-Scherrer method to be 5.795 A.

According to H. Chateau (C.R. hebd. Seances Acad. Sci. 249, (1959)), the lattice constant of silver bromide changes, on addition of small proportions of iodide, according to the law: a (A) = $5.7748 + 3.68 \times 10^{-3} \times c_{AgI}$, wherein a is the lattice constant in A and $c_{AgI}$ is the silver iodide concentration in mol %. Accordingly, the lattice parameter measured corresponds to a concentration of 5.5 mol % of AgI. Additionally it can be concluded from the X-ray picture that the iodide component is homogeneously distributed in the silver bromide lattice.

Measurements of the electrical conductivity indicate a homogeneous distribution of the nickel doping. The nickel content of the halide mixed crystals can be determined by spectral analysis, and it is possible to show that the original content of 100 ppm of nickel has remained unchanged after the halogenation.

What we claim is:

1. A process for the production of a homogeneously doped silver halide which comprises reacting doped silver inside a closed reaction vessel with the vapour of chlorine, bromine or iodine, said doped silver being so positioned that neither the doped silver nor the newly formed halide comes into contact with the walls of the reaction vessel, at a temperature below the melting temperature of the doped silver and above the melting temperature of the doped silver halide, and collecting the doped silver halide thus formed on a support under conditions so adjusted and controlled, that the doped silver halide is recovered in crystalline form, and wherein the ratio of dopant to silver is 0.1 to 100 parts of dopant per million parts of silver, and wherein the dopant is selected from the group consisting of bismuth, cadmium, gallium, indium, lithium, magnesium, nickel, lead, zinc, manganese, titanium, platinum, tin, iron, sulphur, gold and rhodium.

2. Process according to claim 1, wherein said support is stationary or rotating.

3. Process according to claim 1, in which the chlorine, bromine, or iodine vapour pressure at which the reaction is carried out is generated by heating or cooling, in a separate vessel, connected to the reaction vessel, said chlorine, bromine or iodine to a temperature at which the intrinsic vapor pressure of said chlorine, bromine, or iodine corresponds to said pressure in the reaction vessel.

4. Process according to claim 1, in which doped silver is reacted at temperatures of 400° to 700°C.

5. Process according to claim 1, in which said doped silver rods are obtained by zone melting of silver with addition of the doping agent.

6. Process according to claim 1, in which vapour pressure of said chlorine, bromine and iodine in the reaction vessel is 1 to 500 mm Hg.

7. Process according to claim 1, in which the liquid halide formed drips onto a flat rotating quartz plate and there grows in a crystalline form.

8. Process according to claim 1, in which the dopant is at least one element selected from the group consisting of iron, nickel, gold, rhodium, indium and sulphur.

* * * * *